Patented Nov. 11, 1924.

1,515,375

UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

FURNACE LINING AND METHOD OF MAKING THE SAME.

No Drawing. Application filed May 4, 1922. Serial No. 558,528.

*To all whom it may concern:*

Be it known that I, FRANK J. TONE, a resident of Niagara Falls, Niagara County, New York, have invented a new and useful Improvement in Furnace Linings and Methods of Making the Same, of which the following is a full, clear, and exact description.

My invention relates to the manufacture of refractories composed mainly of silicon carbide, and is designed to provide an improved refractory furnace lining and method of making the same.

I will now describe a preferred form of my invention designed for the lining of a furnace, such as an ordinary tilting brass-melting furnace, of the oil-burning type.

I make a mixture of silicon carbide grains, either of the amorphous or crystalline types, with silicate of soda preferably in the proportion of ninety parts by weight of silicon carbide and ten parts by weight of silicate of soda. The silicon carbide grains are preferably a mixture of coarse and fine sizes running, for example, from No. 12 down to the fine powders, this mixture giving a more dense and compact structure. The grade of silicate of soda which I find desirable for this work is that having a gravity of from 45° to 52° Bé. A mixture is made up of these materials with sufficient water to bring it to about the consistency of molding sand.

I then compress or mold this mixture to the desired shape in molds which give the desired form to fit the shell of the furnace. After compressing or molding, the shapes are dried either at room temperature or with a gentle heat. After drying, the articles are mechanically strong and will withstand severe handling. These articles, without any further baking or burning at this stage of the manufacture, may be stored or shipped or otherwise handled as a commercial fireclay refractory. When such shapes or blocks are built into the furnace in the ordinary way with mortar, and the lining is brought up to working temperature in the ordinary manner, the final heating of the lining in situ brings the bond on the inner surface next to the flame to a more or less vitreous condition in which it exerts its bonding power. The parts of the blocks next to the steel shell are not brought up to the same degree of vitrification, and in fact, may not reach a red heat. These portions, therefore, remain of a more porous and open structure. This difference in the structure of the different portions of the blocks after use of the furnace is of considerable advantage, since the outer portions have a much lower heat conductivity than the inner portions and act to conserve the heat of the furnace. Silicon carbide itself is ordinarily a good conductor of heat, but the unvitrified bond of the outer portions of the blocks greatly reduces this conductivity.

In some special applications, I may add to the bond certain percentages of ground fireclay, silica, alumina, or other auxiliary refractory material, and thus additional density or additional strength at higher temperatures is obtained. For example, I have found that a mixture of 80% silicon carbide, 10% kaolin and 10% silicate of soda will give good results. The invention may be applied to furnace linings, muffles, and various refractory articles.

This system gives the advantage of entirely saving the burning cost in the manufacture of refractory shapes or articles, while at the same time the articles have a structural strength for handling and shaping. It presents an advantage over rammed-up linings of similar compositions, since it can be made or pressed to a much greater density, giving greater strength, durability, and resistance to slag penetration after it is burned in place under the heat of the furnace.

The heat-insulating feature is very important, where the blocks are installed in and placed with only one face exposed to the flame or working temperatures. To give greater heat insulation, the structure may be modified by making an outer layer of the article or lining composed of ordinary fireclay, silocel, asbestos or other refractory material having a low coefficient of heat conductivity and bonded with silicate of soda in the same manner as the silicon carbide layer next to the flame or forming the working face of the furnace.

The advantages of my invention as compared, for example, to those of my Patent No. 1,042,844, granted October 29, 1912, lie is premolding, or if desired pre-compressing of the blocks and drying them, so that they may be handled or shipped as blocks or shapes. In this manner, the blocks are mechanically strong and may be handled as a commercial refractory, while at the same time, they present advantages over rammed-up linings in being more dense and having greater strength, durability and resistance to slag penetration. They also give the desirable heat-insulating quality in their outer portions, not exposed directly to the working conditions of the furnace.

Changes may be made in the composition, the proportions of the ingredients, etc., without departing from my invention.

I claim:

1. The method of making furnace linings which includes forming compressed unburned blocks of silicon carbide and silicate of soda, building a furnace lining with said unburned blocks and heating the same in situ to form a well vitrified inner face backed with a poorly vitrified layer of lower heat conductivity.

2. The method of making furnace linings which includes forming compressed unburned blocks of silicon carbide, another refractory material and silicate of soda, building a furnace lining with said unburned blocks and heating the same in situ to form a well vitrified inner face backed with a poorly vitrified layer of lower heat conductivity.

3. The method of making furnace linings which includes forming compressed unburned blocks of silicon carbide, clay and silicate of soda, building a furnace lining with said unburned blocks and heating the same in situ to form a well vitrified inner face backed with a poorly vitrified layer of lower heat conductivity.

4. A compressed unburned brick for furnace linings comprising silicon carbide and silicate of soda and adapted to be built up into a furnace lining and heated in situ to form a well vitrified face backed by a poorly vitrified layer of lower heat conductivity.

5. A compressed unburned brick for furnace linings comprising silicon carbide, another refractory material and silicate of soda and adapted to be built up into a furnace lining and heated in situ to form a well vitrified face backed by a poorly vitrified layer of lower heat conductivity.

6. A compressed unburned brick for furnace linings comprising silicon carbide, clay, and silicate of soda and adapted to be built up into a furnace lining and heated in situ to form a well vitrified face backed by a poorly vitrified layer of lower heat conductivity.

In testimony whereof I have hereunto set my hand.

FRANK J. TONE.